March 3, 1931.   T. J. LYNCH   1,794,468
LEG FOR ONE-RAIL TRUCKS
Filed March 28, 1930
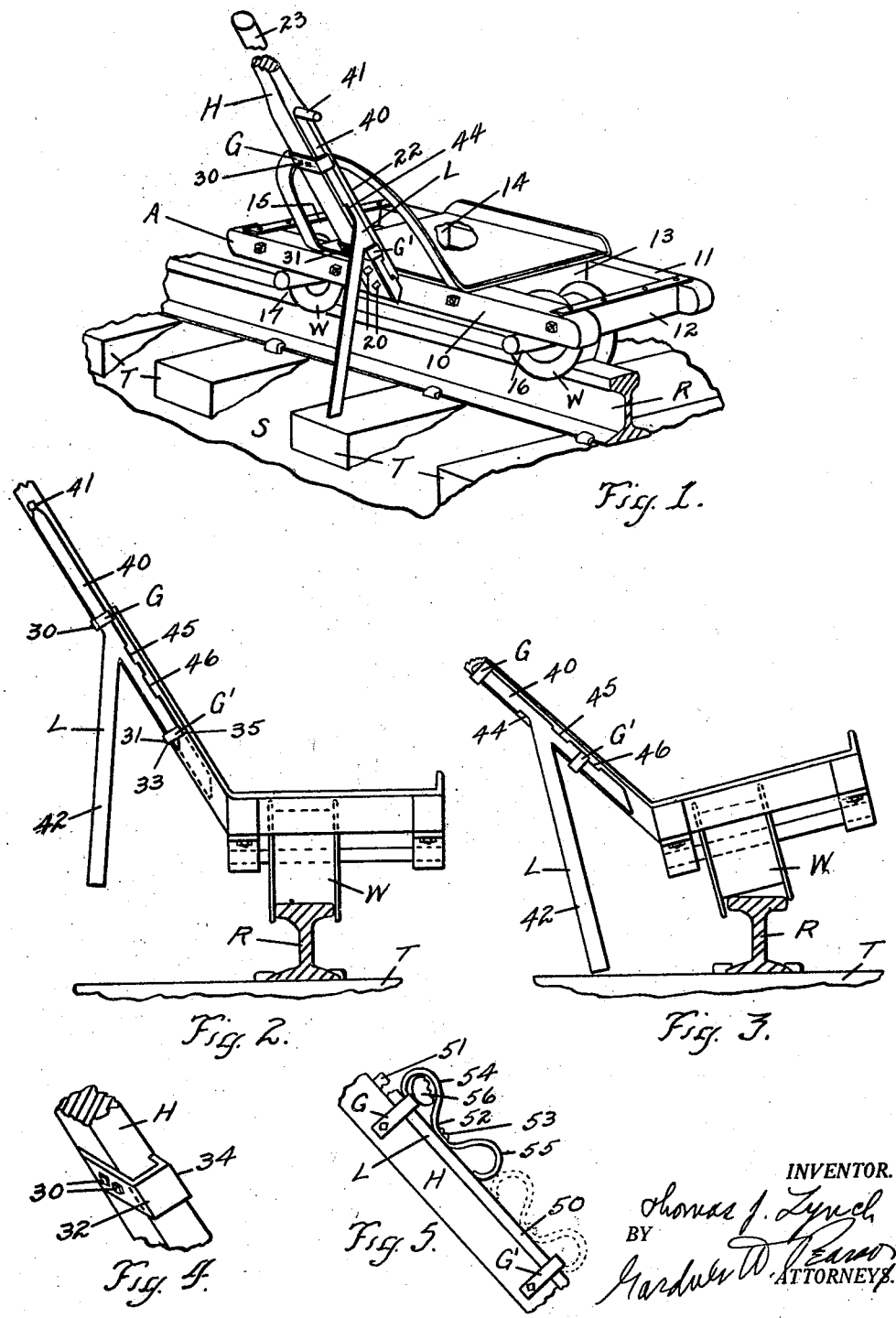

Patented Mar. 3, 1931

1,794,468

UNITED STATES PATENT OFFICE

THOMAS J. LYNCH, OF LOWELL, MASSACHUSETTS, ASSIGNOR TO MARY C. BRENNAN, OF LOWELL, MASSACHUSETTS

LEG FOR ONE-RAIL TRUCKS

Application filed March 28, 1930. Serial No. 439,561.

This invention relates to trucks which are used by workmen on railroads for carrying ties, timber and other material along the rails.

This type of truck may be called a one rail truck as it includes a truck body in which or under which are mounted two wheels arranged in tandem.

It has application to a truck of this character adapted to be propelled by one man, walking along at the side of the rail, by means of a handle which extends up and out laterally at an angle with the frame.

As such trucks are supported while being moved on two wheels arranged tandem, when it is desired that they should be loaded, it is desirable that there should be some arrangement by which the truck can be supported without tipping over.

This has generally been accomplished by the use of legs of different types which are of such character that they will clear the railroad ties when the truck is being moved but can be brought down in some way to rest on the ties or the ground while loading.

I am aware that a fixed leg extending downward has been used and that horizontal legs such as shown in patent to Peirce 1,092,951 of April 14, 1914, have been used, but these must be lifted by tipping the whole truck.

I am also aware that in patent to Peirce 1,052,953 of February 11, 1913, legs which swing forward and back and can be held in the up position have been used and as in patent to Fitz Gerald 1,370,526 of March 8, 1921, a leg pivoted to swing laterally has been used.

There are objections to each of these types and the purpose of this device is to provide a leg which, instead of pivoting, slides up and down and which can be locked in the up or down position and preferably which can be locked in more than one position.

Its advantages are that it will not slip and in the preferred form, the length of the leg can be increased or decreased so that the truck body can be tilted more or less while another advantage is that the leg can be held nearer to or farther away from the body thereby allowing it to reach inside the end of a short tie or nearer the end of a long tie.

In the drawings, Fig. 1 is a perspective view showing my truck at rest for loading with the leg in its longest position.

Fig. 2 is a front elevation of my truck showing the leg raised in the position where the truck is being moved.

Fig. 3 is a front elevation showing the leg down in its short position.

Fig. 4 is an elevation from the side showing part of the shank of the leg and one of the guides.

Fig. 5 is a view similar to Fig. 4 showing a modified construction of the means to engage the guides in order to hold the leg in different positions.

In the drawings, R represents a railroad rail which is supported by ties T, T between which is the ground S.

A represents the main body frame of my truck including the side members 10, 11 and cross members 12, 13, 14 and 15 together with the hangers such as 16 and 17 for the arbors 18 and 19 upon which the wheels W, W, are mounted tandem.

H is a handle fastened to the truck body as by means of bolts 20 so that it projects laterally at an obtuse angle therewith.

As shown, its lower part 22 is rectangular and its upper part 23 is round to be conveniently grasped by the hands.

G and G1 are leg guides spaced and positioned along the rectangular part of the handle, shown as being straps attached by means of bolts 30 and 31 and of such shape that they project forward and are bent at an angle such as 32 and 33 thence back towards the handle at 34 and 35 thereby leaving a rectangular space in which the shank 40 of the leg L is slidable.

Preferably this shank 40 is of rectangular shape being made of flat metal of such size that it will slide easily in the guides G and G1.

41 is a round hand grip which projects from the top of shank 40 and 42 is a foot which projects downwardly at an angle with shank 40 and is of sufficient length to reach a tie such as T when the leg is pushed down by means of the hand grip 41.

44 is a notch in what might be called the lower side of shank 40 in position as shown just at the top of foot 42 and 45 and 46 are similar notches on the top side of shank 40 each of these notches being of a size so that the leg guides G or G1 can easily fit into them or engage them.

While loading, the leg L can be pushed down and the notch 45 can engage guide 41 or as shown in Fig. 3, notch 46 can engage guide G1 depending on whether a greater or less tilt is desired on the truck.

When moving, the leg can be pulled up and the notch 44 can engage the guide G whereby it is held in position out of the way while moving.

As shown in Fig. 5, I may use a shank 50 of a leg which has no notches and which has no hand grip at its top end 51.

In place of both I can use the combination handle and spring L which at the middle 52 is flat and is fastened to handle H by means of the screw 53.

Projecting at the top is a curved spring 54 and a similar one 55 at the bottom, these being of such size that the finger of an operator as indicated at 56 can slip under either spring and lift it away from the guides either G or G1 allowing L to slide down and engage the other guide as desired.

The ends of these springs 54 and 55 can be curved in so that they will easily slip over the desired guide.

Such devices or any other means to hold the leg in different positions may be used.

I claim:

1. In a one rail truck of the class described, the combination of a main body frame and wheels mounted tandem therein, with a handle which projects laterally at an obtuse angle with the frame; a plurality of leg guides positioned along said handle; a frame supporting leg having a shank slidable in said guides along the handle and having at the top a hand grip, at the bottom, a downwardly projecting foot, and between them, notches adapted to engage said leg guides.

2. In a one rail truck of the class described, the combination of a main body frame and wheels mounted tandem therein; with a handle which projects laterally at an obtuse angle with the frame; a plurality of leg guides positioned along said handle; a frame supporting leg having a shank slidable in said guides along the handle and having at the bottom, a downwardly projecting foot; and means to hold said leg in different positions.

THOMAS J. LYNCH.